Feb. 7, 1967 S. C. JACOBS 3,303,019
PURIFICATION OF ALUMINUM
Filed April 23, 1964
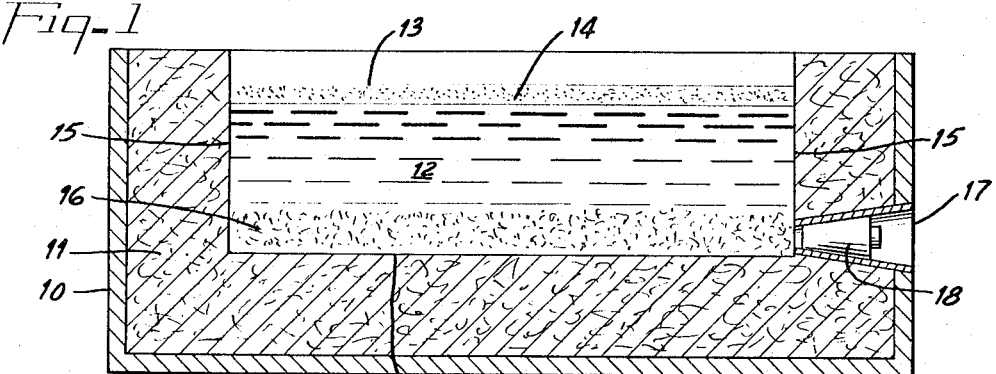
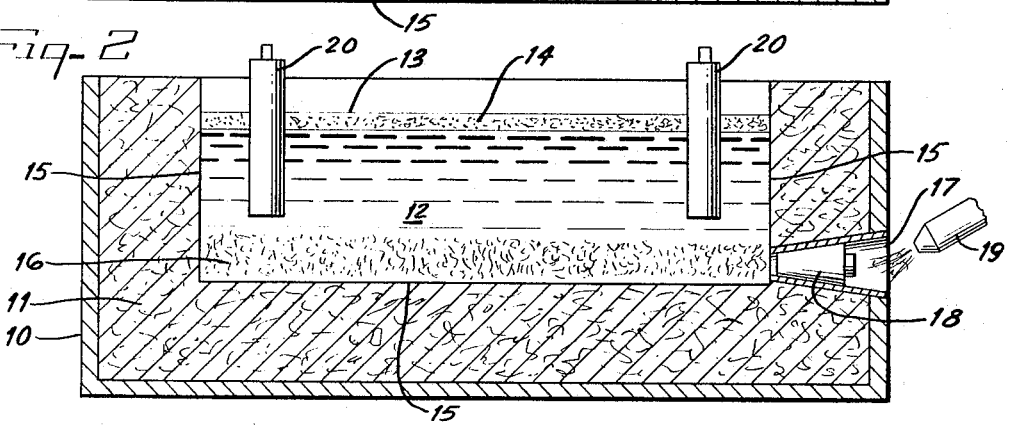
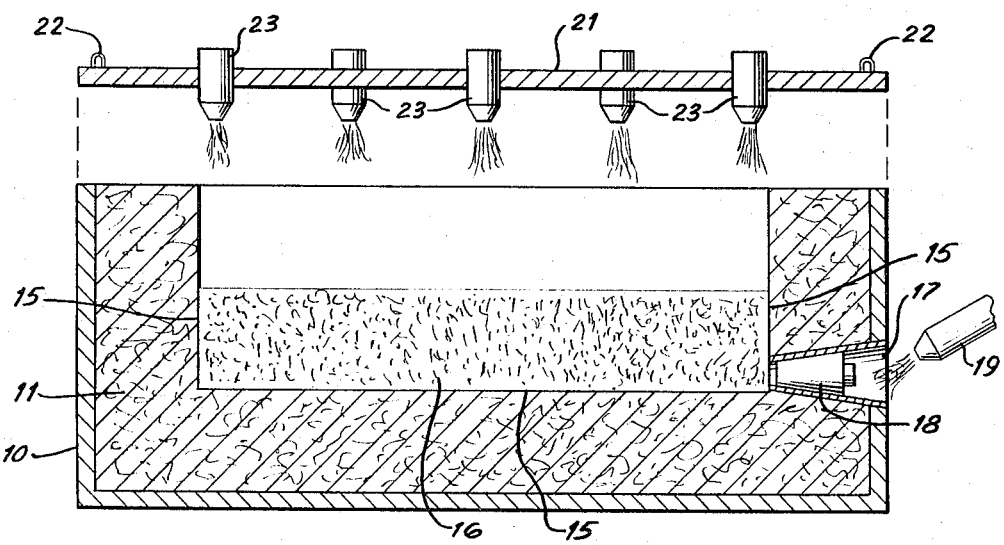
INVENTOR.
STANLEY C. JACOBS
BY
ATTORNEY

United States Patent Office 3,303,019
Patented Feb. 7, 1967

3,303,019
PURIFICATION OF ALUMINUM
Stanley C. Jacobs, Lower Burrell, Pa., assignor to Aluminum Company of America, Pittsburgh, Pa., a corporation of Pennsylvania
Filed Apr. 23, 1964, Ser. No. 362,024
5 Claims. (Cl. 75—68)

This invention relates to improved remelting procedures useful wherever preferential, or fractional, crystallization procedures are used to obtain, or deposit, a mass of recrystallized aluminum crystals which mass is then remelted to obtain fractions containing different amounts of eutectic impurities. The term "eutectic impurities" is used herein to denote those metallics, an amount of any of which, when present in aluminum, form, or tend to form, under ordinary solidification conditions, a characteristic aluminum-containing pattern or structure in the solidified metal which structure has a lower melting point than pure aluminum. These "eutectic impurities" are to be distinguished from what is herein termed "pertectic impurities" which term designates impurities in aluminum which, under ordinary conditions of solidification, solidify at temperatures higher than the melting point of aluminum. The difference between the two types of impurities is here stated because the present invention does not relate to the beneficiation of impure aluminum in respect of "pertectic impurities." Whether an impurity is "pertectic" or "eutectic" as those terms are above defined may sometimes depend on the amount of the impurity present. Iron is an example of an impurity which may be of either type, depending on the amount present. All of this is well known, and thus the terms just defined are here used to indicate physical conditions encountered rather than specific elements. Of the impurities, iron, silicon, gallium and titanium, which invariably occur in small amounts in primary aluminum, only titanium is always a "pertectic impurity." Examples of other common eutectic impurities in primary aluminum are copper, magnesium, zinc and manganese.

The procedural concept of benefication of eutectic impurity-containing aluminum to obtain aluminum of lesser eutectic impurity content by fractional crystallization is premised on the well known fact that when a body of molten aluminum containing eutectic impurities is subjected to cooling the crystals first to solidify are aluminum-rich, i.e., of higher aluminum content than the melt. While the degree of aluminum-richness of crystals decreases as solidification continues, such crystals contain more aluminum than the melt from which they are derived and thus, in consequence, the melt becomes richer in the eutectic impurity—a condition which usually obtains until a eutectic composition is reached as a limiting factor. Thus it is possible by fractional crystallization to obtain a mass of aluminum crystals which, taken as a whole, are of higher purity than the impure aluminum originally melted. Moreover, if this mass of crystals is allowed to accumulate crystal by crystal in the order that the crystals are formed, the purity of the mass of crystals will be greatest at its bottom extremity and least at its top extremity merely because of the fact that the first deposited crystals, being first crystallized, are richer in aluminum than crystals subsequently formed and deposited.

The problem to which the present invention is directed is the obtainment of large fractions of metal of highest average purity by remelting such masses of crystals. As each crystal is formed and moves through the mother liquor from which it precipitated, it carries on its surface, whether by absorption, occlusion or adherence, a portion of that mother liquor which drainage of the crystal mass will not remove. The amount of mother liquor on the surface of a given crystal and the amount which remains after careful drainage may vary, but as a practical matter, some mother liquor remains. Therefore, if the entire mass of crystals obtained by fractional crystallization of a given impure aluminum melt is melted as a whole, the increased purity, i.e., aluminum richness, obtained from the fractional crystallization is decreased, or downgraded, to the extent of the mother liquor retained on the surfaces of the crystals.

The object of the present invention is to provide a remelting procedure by which a large fraction of the mass of crystals is obtained at a maximum purity. Since the economic usefulness of the present invention will depend upon the degree of purity sought in a given fractional crystallization process there will, of course, be occasions when the processes of this invention will not produce an economic gain consistent with cost of processing. The present invention finds its greatest usefulness where a high degree of purity is sought and the invention is particularly useful in the remelting of crystals obtained by a fractional crystallization process developed by others, including the present applicant, which process is fully described in copending application Serial No. 268,168, filed January 31, 1963, now Patent No. 3,211,-547, issued Oct. 12 1965, and in an earlier application, Serial No. 88,334, filed February 10, 1961, now abandoned, of which said copending application is a continuation-in-part.

The process of the present invention may be generally described as the directional, progressive re-melting of a mass of aluminum-rich fractionally crystallized crystals, flowing the resulting remelt of said crystals through at least a portion of the remainder of said mass of crystals and discharging the remelt of said crystals at a rate at least equal to the rate at which said remelting progresses until a minor portion of the mass has been remelted and discharged and then while thereafter continuing the remelting at the selected rate reducing the rate of discharge of subsequently remelted metal until the remainder of the mass of crystals has been substantially remelted and then discharging the molten metal which remains in the remelting chamber. As will hereinafter be more fully explained, collection of remelted fractions during the remelting and discharge process will enable separation of at least two lower purity fractions from the ultimate high purity fraction, the latter having a lower eutectic impurity content than the preceding fraction or fractions.

In a description of the preferred practice of my invention, the process above identified as the subject of a copending application will be used as an example of a fractional crystallization process of the type to which the economic benefits of the present invention particularly pertain, but it will be understood that the present invention may be applied to any mass of crystals which are the product of a fractional crystallization process and that the invention is not limited except as by the terms of the appended claims. For the purpose of illustration and explanation, and not by way of limitation, the following description will have reference to the appended drawings in which:

FIGS. 1 and 2 illustrate schematically, and for the most part in sectional elevation, fractional crystallizatiton processes by which are obtained a mass of aluminum-rich crystals; and FIG. 3 illustrates schematically, and for the most part in sectional elevation, means by which the practice of the present invention may, if desired, be effected.

Referring now to a fractional crystallization process, that described in the aforesaid copending application, as an example of one of the processes in which arise the problems which the present invention is designed to meet; that process generally includes containing the impure molten aluminum to be beneficiated so that an unconfined metal-air interface is established such as that indicated at 13 in FIGURE 1. To this end a container 10 furnished with a heavy lining 11 of good insulating properties, and which may be heated if desired, is employed to contain a body 12 of the impure molten aluminum. This aluminum is, as previously explained, impure in the sense that it contains unwanted eutectic impurities. Heat of solidification is removed from the impure molten aluminum body 12 at such a rate as to maintain formation of aluminum-rich crystals in a zone 14 which is at, under and substantially parallel to said interface 13. During this formation of crystals any substantial loss of heat is prevented at the contained boundaries 15 of said aluminum body. If the insulation 11 is not sufficient for the purpose it may be accomplished in other ways, such as by internally heating said insulating body 11.

The crystals formed at zone 14 by this fractional crystallization process settle by gravity through and into zone 16. When the predetermined amount of recrystallization has been achieved, the still liquid mother liquor 12 is separated from the confined body by drainage through tap hole 17, which, during the recrystallization process, has been sealed by the plug 18. As shown in FIGS. 2 and 3 a gas burner or other heating means 19 may be so located adjacent tap hole 17 as to insure proper thermal conditions at said tap hole for any operation herein described. For convenience of illustration only a single tap hole 17 has been shown and it has been placed at a point which may be taken as being the lowest point of the floor of the chamber of the insulated container 10. It will be apparent that other tap holes may be provided to facilitate drainage either through the side or bottom of the insulated container, thereby to serve the general objective of withdrawing all practically drainable mother liquor from the crystal bed or mass 16. As described in said copending application, the recrystallization process just described, when operated in its preferred form, involves the intermittent application of pressure during the crystallization to compact the aluminum-rich crystals in the lower region of the confined molten body 12, said pressure being applied to not more than half of the total upper area of the mass or bed 16 formed by the crystals. This may be accomplished by a plurality of translatable vertically acting tamps, two of which are indicated at 20 in FIGURE 2.

In any event, once fractional crystallization is complete and the mother liquor has been drained, there remains in the chamber of the insulated container 10 a mass or bed 16 of aluminum-rich crystals, in the manner indicated in FIGURE 3. As previously indicated, the drainable mother liquor does not include all mother liquor since some remains associated with, or trapped between crystals and presents the problem of contamination which this invention seeks, in some part, to alleviate.

In the practice of the process of this invention, it is necessary to use some means of heating by which a mass or bed of recrystallized aluminum-rich crystals may be progressively incrementally melted from one extremity to an opposite extremity thereof. Any means capable of being controlled to achieve such an objective may be used, its nature, depending of course, on the manner in which the recrystallized mass is held during the remelting. In the fractional crystallization process above described, where the mass 16 of crystals is contained, after drainage of mother liquor in the bottom of a chamber the heating device shown in FIGURE 3 will be found useful. It simply consists of a steel plate 21, equipped with sufficient hoist hooks 22, and carrying heating devices such as, for example, the burners indicated at 23. By manipulating the distance of plate 21 from the mass 16, and by controlling the heat furnished by each heating device 23, an even remelting heat of desired intensity may be readily achieved.

The crux of the present invention resides in conducting a progressive incremental remelting of the mass of crystals and discharge of the remelted product in two stages, viz a first stage in which a minor portion of the crystal mass is remelted while the liquid metal is drained off, or otherwise discharged, at not less than approximately the rate at which it is being remelted, and a second and following stage in which the remelt is discharged at a slower rate on the order of 30 to 70 percent of the rate of remelting, this slower discharge rate resulting in a slowly forming pool of molten metal forming above the crystal mass which increases in volume in the chamber in which the mass of crystals is confined and finally covers or engulfs that portion of said mass which has not then been remelted. Once remelting is complete the process is ended and the undischarged pool of metal may then be discharged as a separate and final fraction. It will be thus seen that once remelting begins there are three fractions to be collected, an initial fraction representing discharge of the first stage, a second fraction representing the discharge of the second stage, and a final fraction representing the undischarged remelt at the time remelting is substantially complete. The amount of the crystal mass which is to be remelted in the first stage of this invention is not precisely critical. What is taking place here it is believed, although not proven, is a washing down of the crystal mass which tends to displace or remove at least a part of the undrainable mother liquor. At least about five percent of the metal actually crystallized should be remelted in this first stage, but in total the amount remelted in the first stage plus the amount of drainable mother liquor drained from the crystal mass before the remelting should not greatly exceed the amount of the original impure melt which was not recrystallized. In fractional crystallization processes, for the beneficiation of impure aluminum, it is usual to recrystallize 60 to 85% of the starting weight of the material and as a general rule it is quite usual for at least 50% of the remaining mother liquor to be undrainable by gravity from the crystal mass. These values are not critical but serve to illustrate what is meant by remelting a minor amount of the mass of crystals in the first stage of the remelting process. Since the molten metal discharged during this first stage of remelting is of low quality and is usually blended with the mother liquor predrained from the crystal mass, it has been found economicaly unadvisable that the discharge of the first stage of the remelt plus the predrained mother liquor exceed more than 30 to 40% of the weight of impure material originally subjected to the fractional crystallization.

The manner in which the fractions are taken, or later combined, during the remelting is a pure question of economics having due regard to the existing price schedules or demand for various purities of aluminum. As noted above, the remelt fraction of the first stage of remelt of the process of this invention is impure and is usually combined with the previously drained mother liquor, but obviously, such is not necessarily desirable. The remelt fraction collected during the second remelt stage of the invention, i.e., the reduced discharge over the period from the end of the first stage until remelting is complete will, taken in total, tend to be only slightly purer than the impure starting material and would, therefore, be normally recycled, but obviously it may be collected in a series of fractions of gradually increasing purity should such be economically desirable. The final fraction represents the high purity fraction ultimately sought which, because of its value, gives economic meaning to the processing.

The manner in which the discharge, or drainage, of molten metal is controlled during the second remelt stage of this invention is merely a matter of mechanics. For instance, the tap plug 18 may be unseated sufficiently to maintain the reduced discharge at the indicated order of rate or, as later remarked, other specific devices may be used.

It is desirable in the practice of the invention that heat transfer during remelting be limited to the extent practical to the input of heat by the device used to effect the remelting. Heat transfer through container walls or through tap holes should, preferably, be held to a minimum and to a condition where the tendency is toward input into the crystal mass.

By using the process of this invention, the percent of high purity fraction obtainable from a mass of fractionally crystallized crystals is upgraded over that achieved by using a progressive directional remelting technique in which drainage is not controlled. Indeed, I have found the output of high purity metal to be often increased up to 30 to 40 percent of the initial change of impure metal as the result of the practice of this invention. In the prefered application of my process, which is to the beneficiation of primary aluminum, or aluminum of similar impurity content, I have also found that the process of this invention tends to produce high purity fractions in which a higher percentage of silicon has been removed than is usually removed when the progressive directional incremental remelting of the crystal mass is not accompanied by the above mentioned control of the discharge rate.

Following is an example typical of the preferred practice of the invention together with a description of the method by which the crystal mass subjected to the remelting was obtained:

The impure starting material was aluminum containing, by weight, 99.91% of aluminum, about 0.007% in total of the pertectic impurities titanium, chromium, vanadium and zirconium, 0.028% of iron, 0.042% of silicon and 0.013% of gallium, these three latter being eutectic impurities. After being subjected to known processes for the removal of pertectic impurities, about 1500 pounds of this material in molten condition was poured into a chamber, the walls and bottom of which has been preheated to about 700° C. This chamber, open at its top, had a substantially flat bottom, straight side walls and a tap hole positioned to drain the bottom of the chamber, the tap hole having a minimum diameter of about one inch. This chamber was so sized that the 1500 lb. charge filled it to a depth of 15 inches and presented at the metal-air interface an area of 8.7 square feet. During all ensuing operations the temperature of the walls and bottom of the chamber were held at a level to prevent substantial heat transfer at a confined boundary of the melt. Over a period of 99 minutes heat of solidification was removed at the metal-air interface to induce crystallization at the rate of 74 pounds per square foot of interface per hour. About 70% of the molten starting material was recrystalized. During this fractional crystallization the mass or bed of crystals building up in the lower portion of the chamber was subjected to pressure intermittently applied by a vertically moving heated graphite bar having a pressure applying area of 100 square inches, said bar being laterally displaced after each downward stroke, the speed of each stroke and the ambit of each lateral displacement being such that about once a minute the entire upper surface of the crystal bed was contacted by this device. At the end of this recrystallization process the tap hole was opened and drainable mother liquor was drained off the crystal mass. In this instance, 12% by weight of the original starting material was drained as mother liquor. An even heat was now applied over the surface of the drained mass of crystals, the heating device used being the type previously described in connection with FIGURE 3, and there illustrated. This first stage of progressive downward remelting of the crystal mass was continued until about 250 lbs. of molten material had discharged from the tap hole. The tape hole was completely open and the material discharged from the bottom of the chamber through said hole without any ostensible back pressure or pooling. There was then centered in the one inch diameter tap hole, a heated lateral graphite rod with a seven thirty-seconds of an inch diameter hole through the center which materially restricted the rate of discharge of molten material by about 56 percent. Remelting was continued and the molten material discharged during this second stage was collected until remelting was virtually complete. During the second stage of the remelting a pool of metal is built up in the chamber finally submerging that portion of the mass of crystals which were as yet unmelted. The fraction collected during this second stage amounted to 600 lbs. of metal. Remelting was then discontinued and the molten metal remaining undischarged was collected as the final fraction, its weight being approximately 470 lbs. The initial fraction of about 250 lbs. collected during the first stage of the remelting process was added to the mother liquor predrained from the mass of crystals and the body thus constituted contained 99.81% by weight of aluminum. The fraction collected during second stage of the process, as one 600 lb. fraction, contained 99.92% by weight of aluminum. The final fraction constituted 470 lbs. of metal containing, by weight, 99.993% of aluminum, 0.001% of iron, 0.003% of silicon and 0.002% of gallium, the balance of impurities being pertectic in nature. Thus of approximately 1500 lbs. of starting material, 470 lbs. or nearly 32%, was upgraded to an aluminum purity of 99.993 from a starting purity of 99.91 and the eutectic impurities in the final fraction were lowered from 0.083% to 0.006% by weight. The second fraction of 600 lbs., about 40% of the impure starting material, remained at about its initial purity and was recycled in the process.

Having thus described my invention and a preferred embodiment thereof, what I claim is:

1. In a process of beneficiation of impure aluminum in respect of eutectic impurity contained therein by crystallizing a fraction of said impure metal from a chamber-contained body thereof to form in said chamber a mass of aluminum-rich crystals, removing drainable mother liquor from said mass and said chamber and thereafter progressively and directionally remelting and discharging said mass while collecting at least two fractions thereof of different eutectic impurity content, the improvement of initially discharging molten metal from said progressive remelting operation at a rate at least equal to the rate of remelting until a minor portion of said mass has been remelted and discharged, thereafter restricting the rate of discharge of molten metal from said mass while maintaining approximately the aforesaid rate of remelting until remelting of said mass is substantially complete whereby an increasing volume of remelted metal is retained in said chamber as the progressive remelting is continued, collecting as a fraction the metal discharged from said chamber during the period of said restriction discharge and, thereafter, collecting as a final fraction the molten metal undischarged at the termination of said progressive remelting.

2. The process of claim 1 wherein in the second stage of said remelting the rate of discharge is about 30 to 70% of the rate of remelting.

3. The process of claim 1 characterized by the fact that the rate of discharge during remelting is not subjected to said restriction until the remelted portion of said crystal mass at least equals in weight about 5% of the weight of the initial charge of impure aluminum.

4. The process of claim 1 characterized by the fact that the rate of discharge during remelting is subjected to said restriction before there is remelted a weight of not more than about 40% of the weight of the initial charge of aluminum.

5. The process of claim 1 characterized by the fact that the combined weight of said drainable mother liquor and of the molten metal discharged during remelting and prior to said restriction of said discharge rate approximates in weight that portion of the initial charge of molten metal which was not solidified during said fractional crystallization.

No references cited.

DAVID L. RECK, *Primary Examiner.*

H. W. TARRING, *Assistant Examiner.*